Feb. 23, 1937.  W. H. BASELT  2,071,963
CLASP BRAKE
Filed Dec. 24, 1934  3 Sheets-Sheet 2
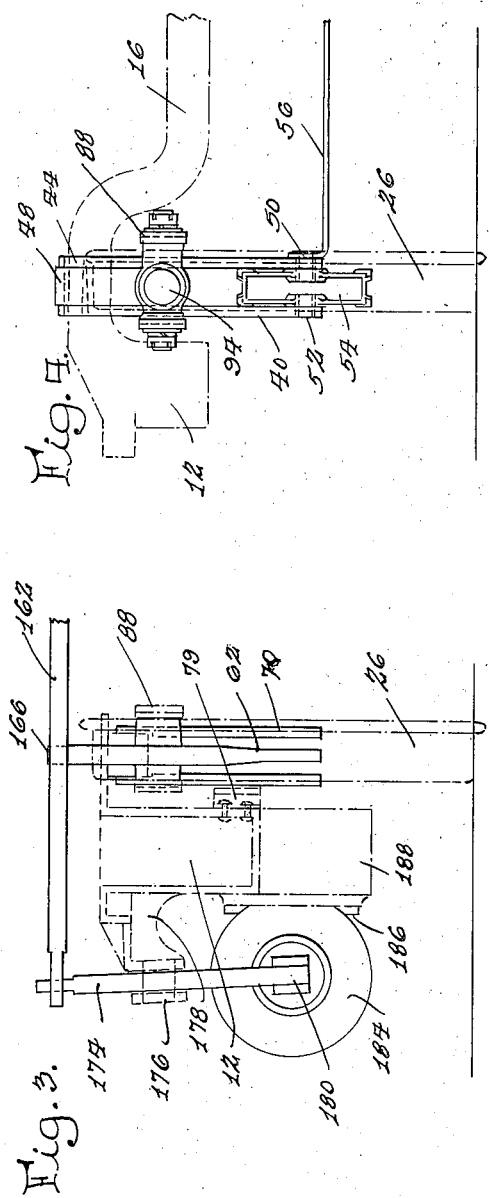
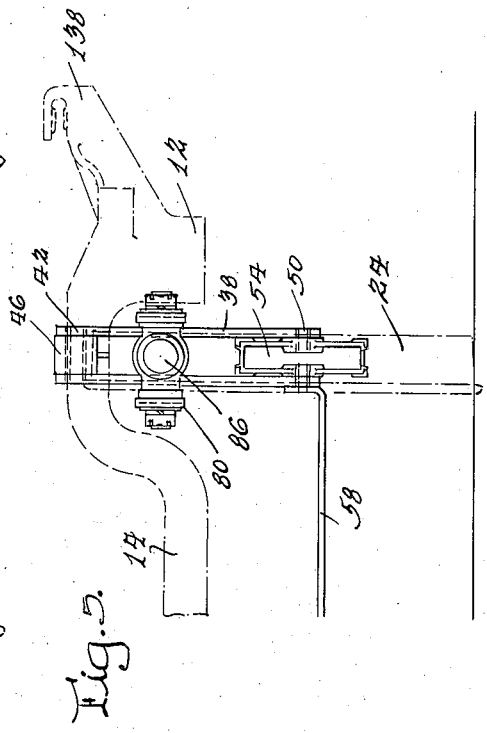
Inventor:-
Walter H. Baselt Feb. 23, 1937.   W. H. BASELT   2,071,963
CLASP BRAKE
Filed Dec. 24, 1934   3 Sheets-Sheet 3

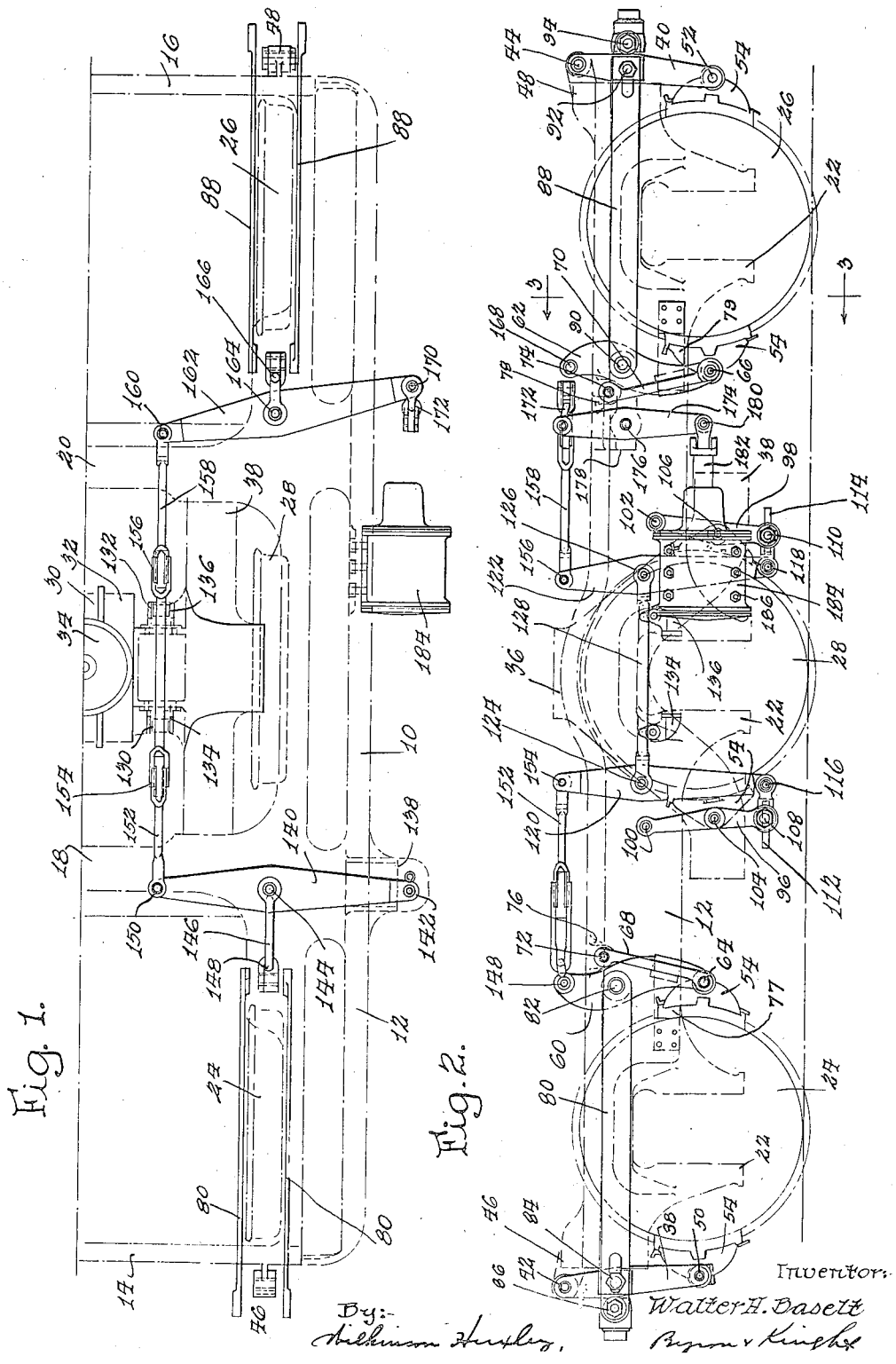

Inventor:-
Walter H. Baselt
By:- Williamson, Huxley, Byron Knight Attys

Patented Feb. 23, 1937

2,071,963

UNITED STATES PATENT OFFICE 2,071,963

CLASP BRAKE

Walter H. Baselt, Chicago, Ill., assignor to American Steel Foundries, Chicago, Ill., a corporation of New Jersey Application December 24, 1934, Serial No. 759,112

35 Claims. (Cl. 188—46)

This invention pertains to car trucks, and more particularly to a unit cylinder clasp brake arrangement for six-wheel trucks.

It is an object of this invention to provide a six-wheel truck brake arrangement adapted particularly for use with car trucks wherein traction motors are geared to the two outer axles.

Another object is to provide a brake arrangement wherein beamless brake rigging is operatively associated with a hanger lever connector type of brake rigging.

Yet another object is to provide a brake arrangement for a six-wheel car truck adapted to be operated by unit cylinder operating means.

A further object is to provide a system of brake rigging wherein pull rod connections are used for the application of the brakes, and one which fulfills all conditions of manufacture and service.

A yet further object is to provide a brake arrangement adapted for use on trains of the high speed type wherein positive and effective braking must be provided.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary top plan view of a truck construction showing one form of the brake arrangement embodying the invention;

Figure 2 is a side elevation of the truck and brake assembly illustrated in Figure 1;

Figure 3 is a fragmentary transverse sectional elevation taken substantially in the plane as indicated by the line 3—3 of Figure 2;

Figure 4 is a fragmentary transverse end elevation taken substantially at the right end of the truck as viewed in Figure 1;

Figure 5 is a fragmentary transverse end elevation taken substantially at the left end of the truck as viewed in Figure 1;

Figure 6:
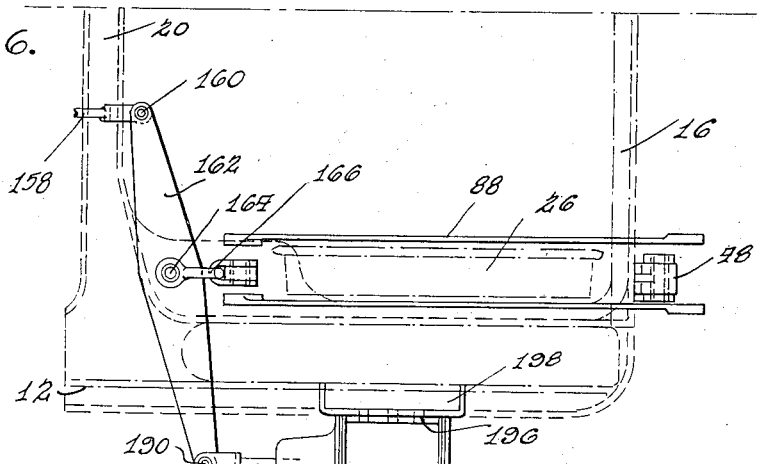
Figure 6 is a fragmentary top plan view taken substantially at the right end of a truck utilizing the brake rigging illustrated in Figures 1 and 2, the same showing a modified form of operating means therefor.

Referring first of all generally to the truck construction and the brake rigging, a truck construction for a six-wheel car truck is shown adapted particularly to be used where the equipment provides for traction motors geared to the two end or outer axles of the truck.

The truck frame 10 consists essentially of the side frame 12 provided with the end rails 14 and 16, and the spaced transoms 18 and 20. The side frame is provided with the spaced pedestals 22 adapted to have cooperative engagement with the journal ends of the end wheel and axle assemblies 24 and 26, and the center wheel and axle assembly 28. The bolster 30 is disposed between the transoms 18 and 20, and consists essentially of the body portion 32, center bearing 34, and side bearings 36, the body portion being provided with the depending arms 38 substantially embracing the center axle and being adapted for swingable connection to the transoms 18 and 20 through suitable means, such as links (not shown).

Adjacent the end wheel and axle assemblies 24 and 26 there are provided the dead truck levers 38 and 40 pivotally connected adjacent the upper ends thereof as at 42 and 44 through suitable brackets 46 and 48 provided on the side frame whereby the truck levers are disposed substantially in the planes of the respective wheels. The lower ends of said dead truck levers are pivotally connected as at 50 and 52 to the brake head and shoe assemblies 54, and the dead truck levers on opposite sides of the truck are pivotally connected as at 50 to each other by means of the straps 56 and 58. On the opposite or inner sides of the end wheels 24 and 26 there are disposed live truck levers 60 and 62, the lower ends of said live truck levers being pivotally connected as at 64 and 66 to their respective brake head and shoe assemblies 54 and to the hanger links 68 and 70, the upper ends of said hanger links being pivotally connected as at 72 and 74 to suitable brackets 76 and 78 provided on the side frame. Spacing brackets 77 and 79 are provided on the side frame having spacing relation to the hangers.

The dead and live truck levers 38 and 60 are connected intermediate the ends thereof by means of the straps or pull rod 80 disposed above the axle and pivotally connected as at 82 to the live truck lever, and pivotally connected as at 84 to the dead truck lever, being also provided adjacent the pivot 84 with the slack adjuster 86. The opposite pair of dead and live truck levers 40 and 62 are connected by means of the straps 88, said straps 88 being pivotally connected as at 90 to the live truck lever intermediate the ends thereof, and pivotally connected as at 92 to the dead truck lever intermediate its ends. The straps 88 are disposed above the axle and provided adjacent the outer end thereof with the slack adjuster 94.

The hanger levers 96 and 98 are pivotally connected to the side frame as at 100 and 102 adjacent the respective transoms 18 and 20 and on each side of the center wheel, said hanger levers intermediate the ends thereof being pivotally connected as at 104 and 106 to brake head and shoe assemblies 54 for braking engagement with the center wheel and axle assembly. The lower ends of the hanger levers 96 and 98 are pivotally connected as at 108 and 110 to the brake beams 112 and 114 securing hanger levers on opposite sides of the truck. The brake beams 112 and 114 are respectively fulcrumed as at 116 and 118 to the lower ends of the live truck levers 120 and 122 disposed inwardly of the bolster arms 38, and consequently inwardly of the adjacent wheel of the center wheel and axle assembly 28. The live truck levers 120 and 122 are pivotally connected as at 124 and 126 to the pull rod 128, said pull rod being anti-frictionally supported as at 130 and 132 by rollers provided on the brackets 134 and 136 carried by the bolster.

The truck side frame is provided with the outwardly extending bracket 138, and the inwardly extending dead auxiliary lever 140 is adjustably pivoted adjacent its outer end as at 142 to said bracket. This auxiliary lever is pivotally connected intermediate its ends as at 144 to the link 146, which in turn is pivotally connected as through a clevis connection 148 to the upper end of the live truck lever 60. The inner end of the dead auxiliary lever 140 is pivotally connected as at 150 to the pull rod 152 which is pivotally connected as at 154 to the upper end of the live truck lever 120. The upper end of the live truck lever 122 is pivotally connected as at 156 to the pull rod 158, said pull rod being pivotally connected as at 160 to the inner end of the live lever 162. The live auxiliary lever 162 is pivotally connected intermediate its ends as at 164 through the clevis 166 to the upper end of the live truck lever 62 as at 168.

Referring now more particularly to the constructions illustrated in Figures 1 to 5 inclusive, the live lever 162 will be considered as an auxiliary lever. The outer end of said auxiliary lever is pivotally connected as at 170 through the clevis connection 172 to the substantially vertically disposed dead cylinder lever 174, said cylinder lever 174 being pivotally connected as at 176 to the bracket 178 provided on the side frame. The lower end of said cylinder lever 174 is pivotally connected as at 180 to the outer end of the piston rod 182 of the operating cylinder 184, said operating cylinder being connected as at 186 to the bracket 188 provided on the side frame adjacent one of the jaws of the center pedestal.

Figure 7:
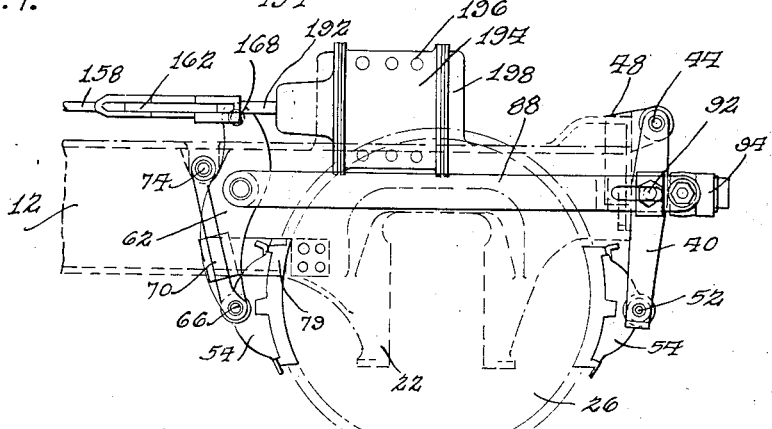
Figure 7 is a fragmentary side elevation of the operating cylinder arrangement illustrated in Figure 6.
Figure 8:
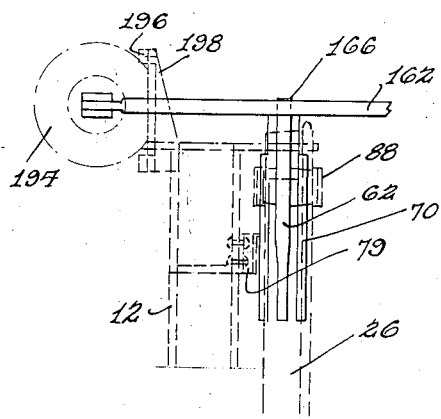
Figure 8 is a transverse end elevation of the construction illustrated in Figures 6 and 7.

In the construction illustrated in Figures 6 to 8 inclusive, the live lever 162 will be considered as a live cylinder lever, and the outer end of said cylinder lever 162 is pivotally connected as at 190 to the piston rod 192 of the operating cylinder 194, said operating cylinder 194 being connected as at 196 to the bracket 198 provided on the truck frame adjacent the end wheel and axle assembly 126.

In operation of the brake rigging as illustrated herein, assuming the brakes to be in inoperative position and in the case of the modification illustrated in Figures 1 to 5 inclusive, movement of the piston 182 toward the right as viewed in Figure 2 causes rotation of the dead cylinder lever 174 in a counterclockwise direction about its pivot 176, thus causing movement of the live auxiliary lever 162 toward the left as viewed in Figure 1. A similar movement is imparted to the live cylinder or auxiliary lever as viewed in Figure 6, as the movement of the piston 192 is toward the left as viewed in said figure, thus causing a similar movement of the lever 162 illustrated in Figure 6, as shown in Figures 1 and 2.

Movement of the auxiliary or cylinder lever 162 toward the left causes movement of the truck lever 62 to apply its brake head and shoe assembly 54 to the periphery of the wheel 26, and also causes the application of the brake head and shoe arrangement 54 of the dead truck lever 40 through the straps 88. Continued movement of lever 162 causes rotation of the lever about the pivot 164 in a clockwise direction, whereupon the pull rod 158 causes movement of the live truck lever 122 to apply its brake head and shoe assembly to the periphery of the center wheel 28, and also a similar movement is induced in the live truck lever 120 through the pull rod 128.

Movement of the live truck lever 120 causes the pull rod 152 to rotate the dead auxiliary lever 140 in a clockwise direction about its pivot 142, whereupon the link 146 is caused to move the dead truck lever 60 to brake-applied position, which in turn causes the dead truck lever 38 to be moved to brake-applied position through the straps 88. Operation of the pistons in an opposite direction causes release of the brake rigging, the release taking place in the opposite direction to that already described.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a six-wheel car truck, the combination of a truck frame including a side frame, end rails and spaced transoms, a bolster disposed between said transoms and supported on said truck frame, spaced wheel and axle assemblies disposed in supporting relation to said truck frame and including end and center wheel and axle assemblies, live and dead truck levers disposed on opposite sides of the end wheel and axle assemblies, pull rods connecting live and dead truck levers associated with the wheels and disposed above the axles of said wheels, live truck levers on each side of the center wheel and axle assembly and connected by a pull rod disposed above the axle of the center wheel and axle assembly, a dead auxiliary lever pivoted to said side frame between the center and one of the end axles and connected intermediate the ends thereof to the live truck lever of said end axle, and connected at its inner end to one of the truck levers of said inner axle, a live auxiliary lever between the center and the other of said end axles, said live auxiliary lever being connected at its inner end to the other of the truck levers of said center wheel and axle assembly, a connection between said live truck lever of said last-named end axle and said live auxiliary lever intermediate the ends thereof, a substantially vertically disposed dead cylinder lever pivotally mounted intermediate the ends thereof to the truck frame and connected adjacent the upper end thereof to the outer end of said live auxiliary lever, an operating cylinder supported on said truck frame adjacent the center axle and having the piston thereof connected to the lower end of said cylinder lever.

2. In a six-wheel car truck, the combination of a truck frame including a side frame, end rails and spaced transoms, a bolster disposed between said transoms and supported on said truck frame, spaced wheel and axle assemblies disposed in supporting relation to said truck frame and including end and center wheel and axle assemblies, live and dead truck levers disposed on opposite sides of the end wheel and axle assemblies, pull rods connecting live and dead truck levers associated with the wheels and disposed above the axles of said wheels, live truck levers on each side of the center wheel and axle assembly and connected by a pull rod disposed above the axle of the center wheel and axle assembly, a dead auxiliary lever pivoted to said side frame between the center and one of the end axles and connected intermediate the ends thereof to the live truck lever of said end axle, and connected at its inner end to one of the truck levers of said inner axle, a live auxiliary lever between the center and the other of said end axles, said live auxiliary lever being connected at its inner end to the other of the truck levers of said center wheel and axle assembly, a connection between said live truck lever of said last-named end axle and said live auxiliary lever intermediate the ends thereof, and operating means including a cylinder having the piston thereof operatively connected to the outer end of said live auxiliary lever.

3. In a six-wheel car truck, the combination of a truck frame including a side frame, end rails and spaced transoms, a bolster disposed between said transoms and supported on said truck frame, spaced wheel and axle assemblies disposed in supporting relation to said truck frame and including end and center wheel and axle assemblies, said side frame having end and center pedestals disposed in cooperating relation to the journal ends of said wheel and axle assemblies, live and dead truck levers disposed on opposite sides of the end wheel and axle assemblies, pull rods connecting live and dead truck levers associated with the wheels, live truck levers on each side of the center wheel and axle assembly and connected by a pull rod, a dead auxiliary lever pivoted to said side frame between the center and one of the end axles and connected intermediate the ends thereof to the live truck lever of said end axle, and connected at its inner end to one of the truck levers of said inner axle, a live auxiliary lever between the center and the other of said end axles, said live auxiliary lever being connected at its inner end to the other of the truck levers of said center wheel and axle assembly, a connection between said live truck lever of said last-named end axle and said live auxiliary lever intermediate the ends thereof, a substantially vertically disposed dead cylinder lever pivotally mounted intermediate the ends thereof to the truck frame and connected adjacent the upper end thereof to the outer end of said live auxiliary lever, an operating cylinder supported on said truck frame adjacent the center axle and having the piston thereof connected to the lower end of said cylinder lever.

4. In a six-wheel car truck, the combination of a truck frame including a side frame, end rails and spaced transoms, a bolster disposed between said transoms and supported on said truck frame, spaced wheel and axle assemblies disposed in supporting relation to said truck frame, and including end and center wheel and axle assemblies, live and dead truck levers disposed on opposite sides of the end wheel and axle assemblies, and substantially in the plane of the wheels thereof, pull rods connecting live and dead truck levers associated with the wheels and disposed above the axles of said wheels, live truck levers on each side of the center wheel and axle assembly and connected by a pull rod disposed above the axle of the center wheel and axle assembly, a dead auxiliary lever pivoted to said side frame between the center and one of the end axles and connected intermediate the ends thereof to the live truck lever of said end axle, and connected at its inner end to one of the truck levers of said inner axle, a live auxiliary lever between the center and the other of said end axles, said live auxiliary lever being connected at its inner end to the other of the truck levers of said center wheel and axle assembly, a connection between said live truck lever of said last-named end axle and said live auxiliary lever intermediate the ends thereof, a substantially vertically disposed dead cylinder lever pivotally mounted intermediate the ends thereof to the truck frame and connected adjacent the upper end thereof to the outer end of said live auxiliary lever, an operating cylinder supported on said truck frame adjacent the center axle and having the piston thereof connected to the lower end of said cylinder lever.

5. In a six-wheel car truck, the combination of a truck frame including a side frame, end rails and spaced transoms, a bolster disposed between said transoms and supported on said truck frame, spaced wheel and axle assemblies disposed in supporting relation to said truck frame, and including end and center wheel and axle assemblies, live and dead truck levers disposed on opposite sides of the end wheel and axle assemblies and substantially in the plane of the wheels thereof, pull rods connecting live and dead truck levers associated with the wheels and disposed above the axles of said wheels, live truck levers on each side of the center wheel and axle assembly and connected by a pull rod disposed above the axle of the center wheel and axle assembly, a dead auxiliary lever pivoted to said side frame between the center and one of the end axles and connected intermediate the ends thereof to the live truck lever of said end axle, and connected at its inner end to one of the truck levers of said inner axle, a live auxiliary lever between the center and the other of said end axles, said live auxiliary lever being connected at its inner end to the other of the truck levers of said center wheel and axle assembly, a connection between said live truck lever of said last-named end axle and said live auxiliary lever intermediate the ends thereof and operating means including a cylinder having the piston thereof operatively connected to the outer end of said live auxiliary lever.

6. In a six-wheel car truck, the combination of a truck frame including a side frame, end rails and spaced transoms, a bolster disposed between said transoms and supported on said truck frame, spaced wheel and axle assemblies disposed in supporting relation to said truck frame, and including end and center wheel and axle assemblies, said side frame having end and center pedestals disposed in cooperating relation to the journal ends of said wheel and axle assemblies, live and dead truck levers disposed on opposite sides of the end wheel and axle assemblies, and substantially in the plane of the wheels thereof, pull rods connecting live and dead truck levers associated with the wheels and disposed above the axles of said wheels, live truck levers on each side of the center wheel and axle assembly and connected by a pull rod disposed above the axle of the center wheel and axle assembly, a dead auxiliary lever pivoted to said side frame between the center and one of the end axles and connected intermediate the ends thereof to the live truck lever of said end axle, and connected at its inner end to one of the truck levers of said inner axle, a live auxiliary lever between the center and the other of said end axles, said live auxiliary lever being connected at its inner end to the other of the truck levers of said center wheel and axle assembly, a connection between said live truck lever of said last-named end axle and said live auxiliary lever intermediate the ends thereof, a substantially vertically disposed dead cylinder lever pivotally mounted intermediate the ends thereof to the truck frame and connected adjacent the upper end thereof to the outer end of said live auxiliary lever, an operating cylinder supported on said truck frame adjacent the center axle and having the piston thereof connected to the lower end of said cylinder lever.

7. In a six-wheel car truck, the combination of a truck frame including a side frame, end rails and spaced transoms, a bolster disposed between said transoms and supported on said truck frame, spaced wheel and axle assemblies disposed in supporting relation to said truck frame, and including end and center wheel and axle assemblies, said side frame having end and center pedestals disposed in cooperating relation to the journal ends of said wheel and axle assemblies, live and dead truck levers disposed on opposite sides of the end wheel and axle assemblies, and substantially in the plane of the wheels thereof, pull rods connecting live and dead truck levers associated with the wheels and disposed above the axles of said wheels, live truck levers on each side of the center wheel and axle assembly and connected by a pull rod disposed above the axle of the center wheel and axle assembly, a dead auxiliary lever pivoted to said side frame between the center and one of the end axles and connected intermediate the ends thereof to the live truck lever of said end axle, and connected at its inner end to one of the truck levers of said inner axle, a live auxiliary lever between the center and the other of said end axles, said live auxiliary lever being connected at its inner end to the other of the truck levers of said center wheel and axle assembly, a connection between said live truck lever of said last-named end axle and said live auxiliary lever intermediate the ends thereof, and operating means including a cylinder having the piston thereof operatively connected to the outer end of said live auxiliary lever.

8. In a six-wheel car truck, the combination of a truck frame including a side frame, end rails and spaced transoms, a bolster disposed between said transoms and supported on said truck frame, spaced wheel and axle assemblies disposed in supporting relation to said truck frame, and including end and center wheel and axle assemblies, live and dead truck levers disposed on opposite sides of the end wheel and axle assemblies, pull rods connecting live and dead truck levers associated with the wheels and disposed above the axles of said wheels, live truck levers on each side of the center wheel and axle assembly and connected by a pull rod disposed above the axle of the center wheel and axle assembly, a dead auxiliary lever pivoted to said side frame between the center and one of the end axles and connected intermediate the ends thereof to the live truck lever of said end axle, and connected at its inner end to one of the truck levers of said inner axle, a live auxiliary lever between the center and the other of said end axles, said live auxiliary lever being connected at its inner end to the other of the truck levers of said center wheel and axle assembly, a connection between said live truck lever of said last-named end axle and said live auxiliary lever intermediate the ends thereof, a substantially vertically disposed dead cylinder lever pivotally mounted intermediate the ends thereof to the truck frame and connected adjacent the upper end thereof to the outer end of said live auxiliary lever, an operating cylinder supported on said truck frame and having the piston thereof connected to the lower end of said cylinder lever.

9. In a car truck, the combination of a truck frame including a side frame having pedestals, wheel and axle assemblies disposed in cooperating relation to said pedestals, a brake arrangement for said wheel and axle assemblies including live and dead truck levers disposed on opposite sides of the wheels of said wheel and axle assemblies, a connection between the live and dead truck levers of each wheel disposed above the axles thereof, a horizontally disposed dead auxiliary lever pivoted adjacent the outer end thereof to said truck frame, a connection between one of the live truck levers and said auxiliary lever, a live auxiliary lever disposed adjacent another live truck lever and connected thereto, connection means between the inner ends of said live and dead auxiliary levers, and operating means connected to the outer end of said live auxiliary lever.

10. In a car truck, the combination of a truck frame including a side frame having pedestals, wheel and axle assemblies disposed in cooperating relation to said pedestals, a brake arrangement for said wheel and axle assemblies including live and dead truck levers disposed on opposite sides of the wheels of said wheel and axle assemblies, a connection between live and dead truck levers of each wheel disposed above the axles thereof, a horizontally disposed dead auxiliary lever pivoted adjacent the outer end thereof to said truck frame, a connection between one of the live truck levers and said auxiliary lever, a live auxiliary lever disposed adjacent another live truck lever and connected thereto, connecting means between the inner ends of said live and dead auxiliary levers, and operating means connected to the outer end of said live auxiliary lever, said operating means including a cylinder supported on one of said pedestals and having the piston thereof operatively connected to the outer end of said live auxiliary lever.

11. In a car truck, the combination of a truck frame including a side frame having pedestals, wheel and axle assemblies disposed in cooperating relation to said pedestals, a brake arrangement for said wheel and axle assemblies including live and dead truck levers disposed on opposite sides of the wheels of said wheel and axle assemblies, a connection between live and dead truck levers of each wheel disposed above the axles thereof, a horizontally disposed dead auxiliary lever pivoted adjacent the outer end thereof to said truck frame, a connection between one of the live truck levers and said auxiliary lever, a live auxiliary lever disposed adjacent another live truck lever and connected thereto, connecting means between the inner ends of said live and dead auxiliary levers, operating means connected to the outer end of said live auxiliary lever, said operating means including a cylinder lever operatively connected to the outer end of said auxiliary lever, and a cylinder the piston of which is operatively connected to said cylinder lever, said cylinder being supported on one of said pedestals.

12. In a car truck, the combination of a truck frame including a side frame having pedestals, wheel and axle assemblies disposed in cooperating relation to said pedestals, a brake arrangement for said wheel and axle assemblies including live and dead truck levers disposed on opposite sides of the wheels of said wheel and axle assemblies, a connection between live and dead truck levers of each wheel disposed above the axles thereof, a horizontally disposed dead auxiliary lever pivoted adjacent the outer end thereof to said truck frame, a connection between one of the live truck levers and said auxiliary lever, a live auxiliary lever disposed adjacent another live truck lever and connected thereto, connecting means between the inner ends of said live and dead auxiliary levers, operating means connected to the outer end of said live auxiliary lever, said operating means including a substantially vertically disposed dead cylinder lever pivoted intermediate the ends thereof to said truck frame, the upper end of said cylinder lever being operatively connected to the outer end of said live auxiliary lever, and a horizontally disposed cylinder connected to one of said pedestals, said cylinder having a piston operatively connected to the lower end of said dead cylinder lever.

13. In a car truck, the combination of a truck frame having wheel and axle assemblies disposed in cooperating relation therewith, a brake arrangement for said wheel and axle assemblies including live and dead truck levers disposed on opposite sides of the wheels of said wheel and axle assemblies, a connection between live and dead truck levers of each wheel disposed above the axles thereof, a horizontally disposed dead auxiliary lever pivoted adjacent the outer end thereof to said truck frame, a connection between one of the live truck levers and said auxiliary lever, a live auxiliary lever disposed adjacent another live truck lever and connected thereto, connecting means between the inner ends of said live and dead auxiliary levers, and operating means connected to the outer end of said live auxiliary lever, said operating means including a horizontally disposed cylinder supported on said truck frame and having a piston operatively connected to the outer end of said dead auxiliary lever.

14. In a car truck, the combination of a truck frame including a side frame, wheel and axle assemblies disposed in supporting relation to said truck frame, a brake arrangement for said wheel and axle assemblies including live and dead truck levers disposed on opposite sides of the wheels of said wheel and axle assemblies, a connection between live and dead truck levers of each wheel disposed above the axles thereof, a horizontally disposed dead auxiliary lever pivoted adjacent the outer end thereof to said truck frame, a connection between one of the live truck levers and said auxiliary lever, a live auxiliary lever disposed adjacent another live truck lever and connected thereto, connecting means between the inner ends of said live and dead auxiliary levers, operating means connected to the outer end of said live auxiliary lever, said operating means including a cylinder supported on said truck frame and having a piston operatively connected to the outer end of said live auxiliary lever.

15. In a car truck, the combination of a truck frame, wheel and axle assemblies disposed in supporting relation to said truck frame, a brake arrangement for said wheel and axle assemblies including live and dead truck levers disposed substantially in the plane of one of said wheels and on opposite sides thereof, a connection between said live and dead truck levers disposed above the axle of said wheel, live truck levers disposed inwardly of another of the wheels and operatively connected by means disposed above the axle of said last-named wheel, a dead auxiliary lever connected adjacent the outer end thereof to said truck frame and connected intermediate the ends thereof to said first named live truck lever, a connection between one of the second-named live truck levers and the inner end of said auxiliary lever, an operating cylinder supported on said truck frame and having a piston operatively connected to the other of said second-named live truck levers.

16. In a car truck, the combination of a truck frame, wheel and axle assemblies disposed in supporting relation to said truck frame, a brake arrangement for said wheel and axle assemblies including live and dead truck levers disposed substantially in the plane of one of said wheels and on opposite sides thereof, a connection between said live and dead truck levers disposed above the axle of said wheel, live truck levers disposed inwardly of an other of the wheels and operatively connected by means disposed above the axle of said last-named wheel, a dead auxiliary lever connected adjacent the outer end thereof to said truck frame and connected intermediate the ends thereof to said first-named live truck lever, a connection between one of the second-named live truck levers and the inner end of said auxiliary lever, a live auxiliary lever pivotally connected adjacent the inner end thereof to the other of said second-named live truck levers, and an operating cylinder supoprted on said side frame and having the piston thereof operatively connected to said live auxiliary lever.

17. In a car truck, the combination of a truck frame including a side frame, wheel and axle assemblies disposed in supporting relation to said side frame, a brake arrangement for said wheel and axle assemblies including live and dead truck levers disposed substantially in the plane of one of said wheels and on opposite sides thereof, a connection between said live and dead truck levers disposed above the axle of said wheel, live truck levers disposed inwardly of another of the wheels and operatively connected by means disposed above the axle of said last-named wheel, a dead auxiliary lever connected adjacent the outer end thereof to said truck frame and connected intermediate the ends thereof to said first-named live truck lever, a connection between one of the second-named live truck levers and the inner end of said auxiliary lever, a substantially horizontally disposed live auxiliary lever having the inner end thereof operatively connected to the other of said second-named live truck levers, a substantially vertically disposed dead cylinder lever pivoted to said side frame and having the upper end thereof operatively connected to said live auxiliary lever, and an operating cylinder supported on said truck frame and having the piston thereof operatively connected to the lower end of said cylinder lever.

18. In a car truck, the combination of a truck frame, wheel and axle assemblies disposed in supporting relation to said truck frame, a brake arrangement for said wheel and axle assemblies including live and dead truck levers disposed substantially in the plane of one of the wheels and on opposite sides thereof and being connected above the axle of said wheel, live truck levers disposed inwardly of another of the wheels and operatively connected above the axle of said last-named wheel, a dead auxiliary lever pivotally connected adjacent the outer end thereof to said truck frame and operatively connected adjacent the inner end thereof to one of said last-named live truck levers, a live auxiliary lever disposed between adjacent wheels and operatively connected adjacent the inner end thereof to the other of said second-named live truck levers, said live auxiliary lever being operatively connected intermediate the ends thereof to the first-named live truck lever, and operating means connected to the outer end of said auxiliary lever.

19. In a car truck, the combination of a truck frame, wheel and axle assemblies disposed in supporting relation to said truck frame, a brake arrangement for said wheel and axle assemblies including live and dead truck levers disposed substantially in the plane of one of the wheels and on opposite sides thereof and being connected above the axle of said wheel, live truck levers disposed inwardly of another of the wheels and operatively connected above the axle of said last-named wheel, a dead auxiliary lever pivotally connected adjacent the outer end thereof to said truck frame and operatively connected adjacent the inner end thereof to one of said last-named live truck levers, a live auxiliary lever disposed between adjacent wheels and operatively connected adjacent the inner end thereof to the other of said second-named live truck levers, said live auxiliary lever being operatively connected intermediate the ends thereof to the first-named live truck lever, a substantially vertically disposed dead cylinder lever pivotally connected to said truck frame and having the upper end thereof operatively connected to the outer end of said live auxiliary lever, and a cylinder supported on said truck frame and having the piston thereof connected to the lower end of said cylinder lever.

20. In a car truck, the combination of a truck frame including a side frame having journal means thereon, wheel and axle assemblies disposed in cooperative relation to said journal means, a brake arrangement for said wheel and axle assemblies including live and dead truck levers disposed on opposite sides of said wheels of said wheel and axle assemblies, a connection between the live and dead truck levers of each wheel, a horizontally disposed dead auxiliary lever pivoted to said truck frame, a connection between one of the live truck levers and said auxiliary lever, a live auxiliary lever disposed adjacent another live truck lever and connected thereto, connection means between ends of said live and dead auxiliary levers, a substantially vertically disposed cylinder lever pivoted to the truck frame and connected to said live auxiliary lever and operating means supported on said truck frame and connected to said live auxiliary lever.

21. In a car truck, the combination of a truck frame including a side frame having journal means thereon, wheel and axle assemblies disposed in cooperative relation to said journal means, a brake arrangement for said wheel and axle assemblies including live and dead truck levers disposed on opposite sides of said wheels of said wheel and axle assemblies, a connection between the live and dead truck levers of each wheel, a horizontally disposed dead auxiliary lever pivoted to said truck frame, a connection between one of the live truck levers and said auxiliary lever, a live auxiliary lever disposed adjacent another live truck lever and connected thereto, connection means between the inner ends of said live and dead auxiliary levers, a cylinder lever pivoted to the truck frame and connected to said live auxiliary lever and operating means supported on said truck frame and connected to said live auxiliary lever.

22. In a car truck, the combination of a truck frame including a side frame having journal means, wheel and axle assemblies disposed in cooperative relation with said journal means, a brake arrangement for said wheel and axle assemblies including truck levers disposed on opposite sides of the wheels of said wheel and axle assemblies, a connection between truck levers of each wheel, a dead auxiliary lever pivoted to said truck frame, a connection between said dead auxiliary lever and one of said truck levers, a line cylinder lever connected to said dead auxiliary lever, and an operating cylinder, the piston of which is connected to one end of said cylinder lever for operating said brake arrangement.

23. In a brake arrangement, the combination of a truck frame, wheels supporting said frame, brake rigging disposed in braking relation to said wheels, a portion of said brake rigging being provided with brake beams operable inboard of said wheels, and another portion being of the beamless type operable in the plane of said wheels.

24. In a brake arrangement, the combination of a truck frame, adjacent wheels supporting said frame, brake rigging disposed in braking relation to said wheels, said brake rigging including truck levers disposed inwardly of the plane of one of said wheels, and truck levers disposed substantially in the plane of one of said wheels, a connection between truck levers on opposite sides of each axle of each of the wheels, a horizontal lever connected to a truck lever of each of said wheels, and operating means connected to said horizontal lever.

25. In a brake arrangement, the combination of a truck frame, wheels supporting said frame, brake rigging disposed in braking relation to said wheels, said brake rigging including a dead lever pivoted to said truck frame adjacent the outer end of said lever, a connection to said brake rigging and said dead lever intermediate the ends of said dead lever, a live lever connected adjacent the inner end thereof to the inner end of said dead lever, a connection between the brake rigging and the live lever intermediate the ends of said live lever, and operating means connected to the outer end of said live lever.

26. In a brake arrangement, the combination of a truck frame, wheels supporting said frame, brake rigging disposed in braking relation to said wheels, said brake rigging including a dead lever pivoted to said truck frame adjacent the outer end of said lever, a connection to said brake rigging and said dead lever intermediate the ends of said dead lever, a live lever connected adjacent the inner end thereof to the inner end of said dead lever, a connection between the brake rigging and the live lever intermediate the ends of said live lever, and operating means connected to the outer end of said live lever, said operating means including a brake cylinder disposed between said dead and live levers.

27. In a brake arrangement, the combination of a truck frame, wheels supporting said frame, brake rigging disposed in braking relation to said wheels, said brake rigging including a dead lever pivoted to said truck frame adjacent the outer end of said lever, a connection to said brake rigging and said dead lever intermediate the ends of said dead lever, a live lever connected adjacent the inner end thereof to the inner end of said dead lever, a connection between the brake rigging and the live lever intermediate the ends of said live lever, and operating means connected to the outer end of said live lever, said operating means including a brake cylinder, said live lever being disposed between said cylinder and said dead lever.

28. In a brake arrangement, the combination of a truck frame, wheels supporting said frame, brake rigging disposed in braking relation to said wheels, said brake rigging including a dead lever pivoted to the truck frame adjacent the outer end of said lever, a connection to said brake rigging and dead lever intermediate the ends of said dead lever, a live lever connected adjacent the inner end thereof to the inner end of said dead lever, and operating means connected to the outer ends of said live lever.

29. In a brake arrangement, the combination of a truck frame, wheels supporting said frame, brake rigging disposed in braking relation to said wheels, said brake rigging including a dead lever pivoted to the truck frame adjacent the outer end of said lever, a live lever connected adjacent the inner end thereof to the inner end of said dead lever, a connection between the brake rigging and the live lever intermediate the ends of said live lever, and operating means connected to said live lever adjacent the other end thereof.

30. In a brake arrangement, the combination of a truck frame, wheels supporting said frame, brake rigging disposed in braking relation to said wheels, said brake rigging including truck levers disposed on opposite sides of the axle of the adjacent wheel, a connection between said truck levers, a dead lever pivoted adjacent the outer end thereof to said truck frame, said dead lever being connected adjacent the inner end thereof to one of said truck levers, a live lever connected adjacent the inner end thereof to the other of said truck levers, and operating means operatively connected to the outer end of said live lever.

31. In a brake arrangement, the combination of a truck frame, wheels supporting said frame, brake rigging disposed in braking relation to said wheels, said brake rigging including a horizontally disposed dead lever connected intermediate the ends thereof to said brake rigging, a live lever connected at its inner end to said dead lever and connected intermediate the ends thereof to said brake rigging, and operating means connected to said live lever adjacent the outer end thereof.

32. In a brake arrangement, the combination of a truck frame, wheels supporting said frame, brake rigging disposed in braking relation to said wheels, said brake rigging including a dead lever pivoted to said truck frame adjacent the outer end of said lever, a connection to said brake rigging and said dead lever intermediate the ends of said dead lever, a live lever connected adjacent the inner end thereof to the inner end of said dead lever, a connection between the brake rigging and the live lever intermediate the ends of said live lever, and operating means connected to the outer end of said live lever, said operating means including a brake cylinder, one of said levers being disposed between said cylinder and the other of said levers.

33. In a car truck, the combination of a truck frame including a side frame having journal means thereon, wheel and axle assemblies disposed in cooperative relation to said journal means, a brake arrangement for said wheel and axle assemblies including live and dead truck levers disposed on opposite sides of said wheels of said wheel and axle assemblies, a connection between the live and dead truck levers of each wheel, a horizontally disposed dead auxiliary lever pivoted to said truck frame, a connection between one of the live truck levers and said auxiliary lever, a live auxiliary lever disposed adjacent another live truck lever and connected thereto, connection means between the ends of said live and dead auxiliary levers, a substantially vertically disposed cylinder lever pivoted to the truck frame and connected to said live auxiliary lever and operating means supported on said truck frame and connected to said live auxiliary lever.

34. In a brake arrangement for a six-wheel car truck, the combination of a truck frame, end and intermediate wheels supporting said frame, brake rigging disposed in braking relation to said wheels, a portion of said brake rigging being provided with brake beams for said intermediate wheels and operable inboard of said wheels, and another portion being of the beamless type for said end wheels operable in the plane of said wheels.

35. In a brake arrangement, the combination of a truck frame, wheels supporting said frame, brake rigging disposed in braking relation to said wheels, said brake rigging including a horizontally disposed dead lever connected intermediate the ends thereof to a portion of said brake rigging for one of said wheels, a live lever connected to one end of said dead lever and connected intermediate the ends thereof to a portion of said brake rigging for another of said wheels, and operating means connected to said live lever adjacent an end thereof.

WALTER H. BASELT.